United States Patent
Stolbikov et al.

(10) Patent No.: US 11,558,374 B2
(45) Date of Patent: Jan. 17, 2023

(54) SYSTEMS, APPARATUS, AND METHODS FOR VERIFYING A PASSWORD UTILIZING COMMITMENTS

(71) Applicant: LENOVO (Singapore) PTE. LTD., New Tech Park (SG)

(72) Inventors: Igor Stolbikov, Apex, NC (US); Joshua N. Novak, Wake Forest, NC (US); Scott Wentao Li, Cary, NC (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 65 days.

(21) Appl. No.: 17/219,581

(22) Filed: Mar. 31, 2021

(65) Prior Publication Data
US 2022/0321555 A1    Oct. 6, 2022

(51) Int. Cl.
    *H04L 29/06*    (2006.01)
    *H04L 9/40*    (2022.01)
    *H04L 9/30*    (2006.01)
    *H04L 9/32*    (2006.01)
(52) U.S. Cl.
    CPC ........ *H04L 63/0846* (2013.01); *H04L 9/3066* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 11,399,285 B2* | 7/2022 | Smith | H04W 12/50 |
| 2017/0357799 A1* | 12/2017 | Fehér | H04L 63/0846 |
| 2019/0273612 A1* | 9/2019 | Sinha | H04J 3/0667 |
| 2020/0228317 A1* | 7/2020 | Ma | H04L 9/3218 |
| 2021/0091955 A1* | 3/2021 | De Hoogh | H04L 9/3226 |
| 2022/0076253 A1* | 3/2022 | Chaum | H04L 9/3297 |
| 2022/0138707 A1* | 5/2022 | Makrides | G06Q 20/38 705/71 |

* cited by examiner

*Primary Examiner* — Jeffery L Williams
(74) *Attorney, Agent, or Firm* — Kunzler Bean & Adamson

(57) ABSTRACT

Methods that can verify a password utilizing commitments are provided. One method includes receiving from a client device and storing, by a processor, an initial commitment representing a password for a user account without storing the actual password on the apparatus, receiving, from the client device, a subsequent commitment, and verifying that the subsequent commitment represents the password for the user account based on a difference between the initial commitment and the subsequent commitment. Systems and apparatus that can include, perform, and/or implement the methods are also provided.

20 Claims, 14 Drawing Sheets

SYSTEMS, APPARATUS, AND METHODS FOR VERIFYING A PASSWORD UTILIZING COMMITMENTS

FIELD

The subject matter disclosed herein relates to computing networks, systems, and apparatus and, more particularly, relates to computing networks, systems, and methods for verifying a password utilizing commitments.

BACKGROUND

In some conventional computing network, systems, and apparatus, user passwords are sent in clear form from a client device to a server and then hashed on the server. In other conventional computing network, systems, and apparatus, the user passwords are hashed on the client device using a static key (or salt) and then transmitted to the server for storage on the server. In further conventional computing network, systems, and apparatus, the user passwords are encrypted with a public/private key cryptography and interactive zero knowledge systems (ZKS) schemas. While these techniques provide a level of password protection, improved password protection can be made available.

BRIEF SUMMARY

Methods, systems, apparatus, and methods that can verify a password utilizing commitments are provided. One method includes receiving from a client device and storing, by a processor, an initial commitment representing a password for a user account without storing the actual password on the apparatus and receiving, from the client device, a subsequent commitment, and verifying that the subsequent commitment represents the password for the user account based on a difference between the initial commitment and the subsequent commitment.

A system includes a processor of an information handling device and a memory configured to store code executable by the processor. The code causes the processor to receive, from a client device, and store an initial commitment representing a password for a user account without storing the actual password on the apparatus, receive, from the client device, a subsequent commitment, and verify that the subsequent commitment represents the password for the user account based on a difference between the initial commitment and the subsequent commitment.

A computer program product comprising a computer-readable storage medium configured to store code executable by a processor are also provided. The executable code comprises code to perform receiving from a client device and storing an initial commitment representing a password for a user account without storing the actual password on the apparatus, receiving, from the client device, a subsequent commitment, and verifying that the subsequent commitment represents the password for the user account based on a difference between the initial commitment and the subsequent commitment.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
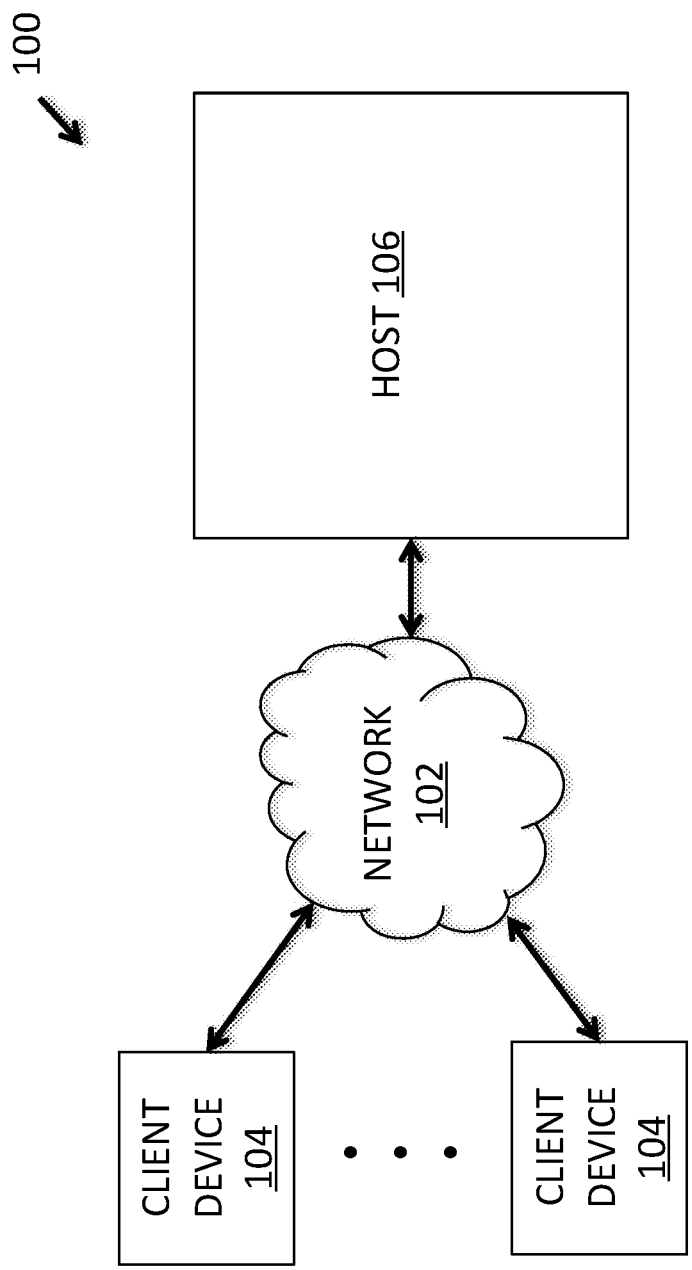
FIG. 1 is a block diagram of one embodiment of a system or network for verifying a password utilizing commitments.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing system 100 including a network 102 connecting a set of client devices 104 (also simply referred individually, in various groups, or collectively as client device(s) 104) and a host system and/or device 106 (also simply referred to as host 106). The network 102 may be any suitable wired and/or wireless network 102 (e.g., public and/or private computer networks in any number and/or configuration (e.g., the Internet, an intranet, a cloud network, etc.)) that is known or developed in the future that enables the set of client devices 104 and the host 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can include any suitable computing hardware and/or software (e.g., a thick client, a thin client, or hybrid thereof) capable of accessing the host 106 via the network 102. A client device 104 can also include a computing device and/or computing system, and may also be referred to herein as an information handling device and/or information handling system.

Each client device 104, as part of its respective operation, relies on sending I/O requests to the host 106 to write data, read data, and/or modify data. Specifically, each client device 104 can transmit I/O requests to read, write, store, communicate, propagate, and/or transport instructions, data, computer programs, software, code, routines, etc., to the host 106 and may comprise at least a portion of a client-server model. In general, the host 106 can be accessed by the client device(s) 104 and/or communication with the host 106 can be initiated by the client device(s) 104 through a network socket (not shown) utilizing one or more inter-process networking techniques.

In various embodiments, the client device(s) 104 utilize a password to access the host 106. The password can be generated by a client device 104 and/or by a user of the client device. The password is stored on the client device 104 and is verified by the host 106 to access the host 106, as discussed in greater detail elsewhere herein. In other words, the password is not stored on the host 106, but is verified by the host 106 when the client device 104 attempts to access the host 106.

In some embodiments, verification of the password is performed utilizing a commitment schema. In additional or alternative embodiments, verification of the password is performed utilizing a time-based commitment schema. In further additional or alternative embodiments, verification of the password is performed utilizing a time-based Pedersen commitment schema. Each of these commitment schemas is discussed in greater detail elsewhere herein.

Figure 2A:
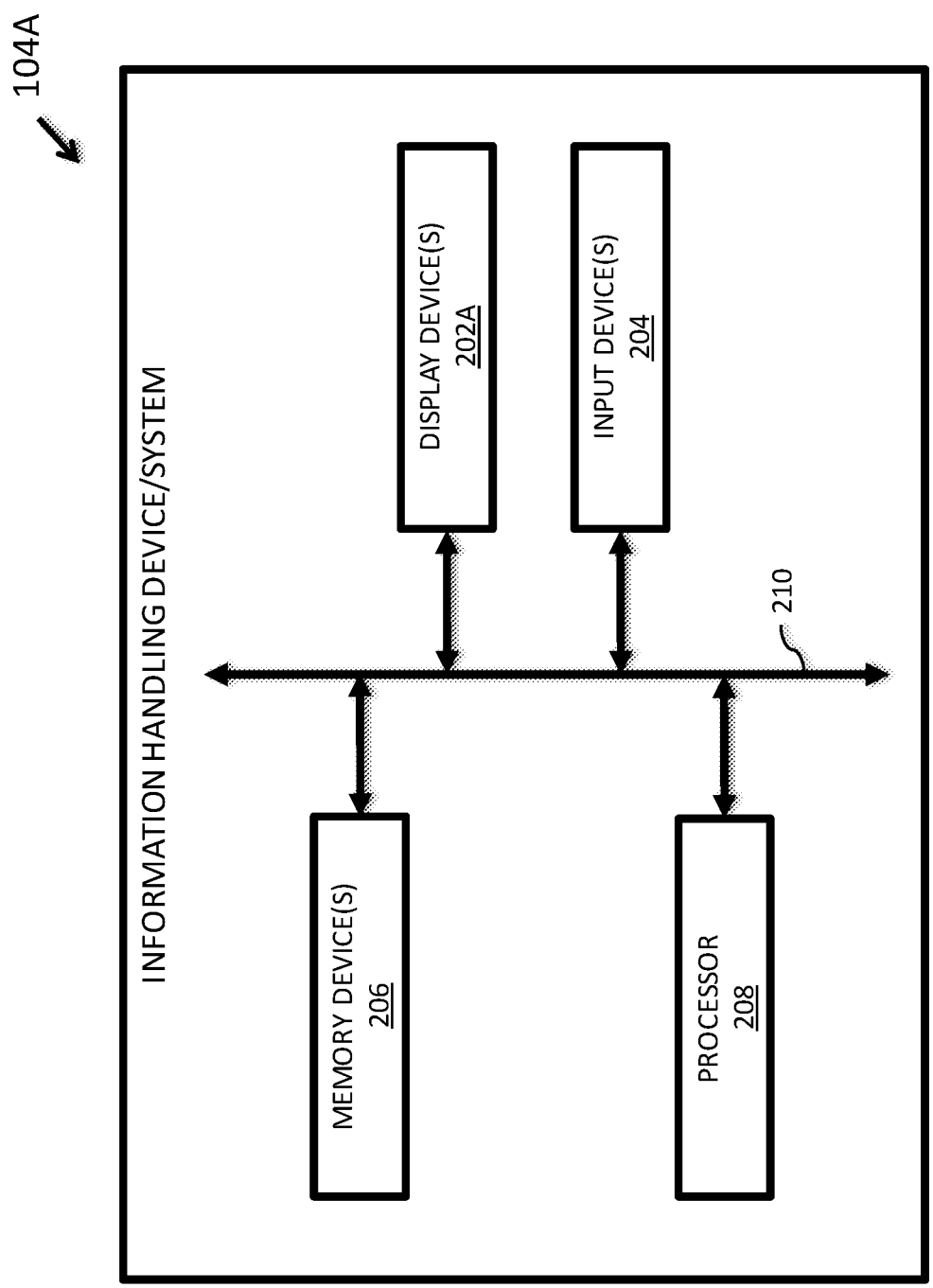
FIG. 2A is a block diagram of one embodiment of a client device included in the system/network of FIG. 1.

Referring to FIG. 2A, FIG. 2A is a block diagram of one embodiment of a client device 104A illustrated in and discussed with reference to FIG. 1. In various embodiments, a client device 104A may form a mobile computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other mobile computing devices and/or or information handling devices that are possible and contemplated herein). At least in the illustrated embodiment, a client device 104A includes, among other components, a set of display devices 202, a set of input devices 204, a set of memory devices 206, and a processor 208 coupled to and in communication with one another via a bus 210 (e.g., a wired and/or wireless bus).

A display device 202A may include any suitable hardware and/or software that can display digital information (e.g., digital data) thereon. In various embodiments, the display device 202A includes an internal display device or other similar device that can display data thereon that forms a portion of an information handling device. In some embodiments, the display device 202A includes a touch screen that can receive one or more inputs from a user via the user's fingers and/or a stylus, etc.

An input device 204 may include any suitable hardware and/or software that can receive a user input (e.g., a password). Examples of an input device 204 include, but are not limited to, a keyboard, a touchscreen, a mouse, a trackball, a joystick, a touchpad, a scanner, and/or a pointing stick, etc., among other devices that are capable of receiving user inputs that are possible and contemplated herein.

A set of input devices 204 may include any suitable quantity of input devices 204. In some embodiments, the set of input devices 204 includes one (1) input device 204. In other embodiments, the set of input devices 204 includes two (2) or more input devices 204.

A set of memory devices 206 may include any suitable quantity of memory devices 206. Further, a memory device 206 may include any suitable type of storage and/or memory device and/or system that is known or developed in the future that can store computer-useable and/or computer-readable code.

In various embodiments, a memory device 206 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device. In some embodiments, the memory device(s) 206 are configured to store one or more passwords for accessing the host 106. The password(s) may be generated by the client device 104 and/or by a user.

A memory device 206, in some embodiments, includes volatile computer storage media. For example, a memory device 206 may include random access memory (RAM), including dynamic RAM (DRAM), synchronous dynamic RAM (SDRAM), and/or static RAM (SRAM). In other embodiments, a memory device 206 includes non-volatile computer storage media. For example, a memory device 206 may include a hard disk drive, a flash memory, and/or any other suitable non-volatile computer storage device that is known or developed in the future. In various embodiments, a memory device 206 includes both volatile and non-volatile computer storage media. In additional embodiments, a memory device 206 also stores program code and/or related data, such as an operating system (OS) and/or other controller algorithms operating on a client device 104.

Figure 3:
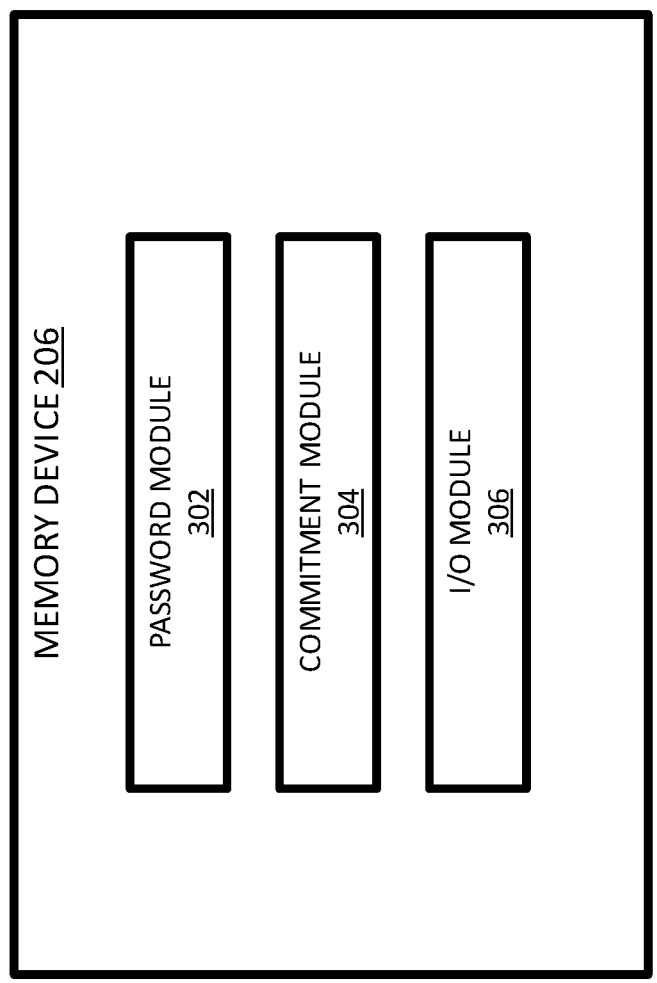
FIG. 3 is a block diagram of one embodiment of a memory device included in the client device of FIG. 2A or 2B.

With reference now to FIG. 3, FIG. 3 is a schematic block diagram of an embodiment of a memory device 206. At least in the illustrated embodiment, the memory device 206 includes, among other components, a password module 302, a commitment module 304, and an input/output (I/O) module 306.

A password module 302 may include any suitable hardware and/or software that can generate one or more passwords and/or receive one or more passwords from a user (e.g., via the input device 204) for accessing the host 106. The password(s) may include any suitable password that is known or developed in the future. In various embodiments, a password may include alphanumeric characters and/or biometric data transformed into one or more values upon which mathematical calculations can be performed.

The password module 302, in some embodiments, is configured to store the password(s). In various embodiments, the password module 302 is configured to transmit the password(s) to the commitment module 304 for processing thereon.

A commitment module 304 may include any suitable hardware and/or software that can implement a commitment schema on a password. In various embodiments, the commitment module 304 is configured to receive a password from the password module 302 and implement a commitment schema on the password.

In various embodiments, the commitment schema includes a time-based commitment schema. In further embodiments, the commitment schema includes a Pedersen commitment schema. In additional or alternative embodiments, the commitment schema includes a time-based Pedersen commitment schema.

In various embodiments, the commitment schema includes an elliptical curve based on an Elliptic Curve Discreet Logarithm Problem (ECDLP). Further, the commitment schema may utilize any suitable elliptical curve equation. Alternative embodiments may utilize a commitment schema based on the Elliptic Curve Discreet Logarithm Problem.

In some embodiments, the ECDLP commitment C(S, R) is represented by equation 1, $$C=(S*G)+(R*H). \qquad (1)$$

In equation (1), S is a hashed value of the password (e.g., calculated by a hash module 402 (see, e.g., FIG. 4)), G is an elliptical generator value for the elliptical curve (e.g., determined/identified by a generator module 404 (see, e.g., FIG. 4)), H is the elliptical generator value G hashed to a timestamp value to a point on the elliptical curve (e.g., calculated by a timestamp module 406 (see, e.g., FIG. 4)), and R is a random salt value (e.g., calculated by an encryption module 408 (see, e.g., FIG. 4)), each of which is discussed in greater detail elsewhere herein.

The elliptical curve may include any suitable elliptical curve parameters that are known or developed in the future. In some embodiments, the elliptical curve includes a public field parameter with a prime number and/or quantity of elements. That is, in various embodiments, the elliptical curve can include the field secp256k1, secp384k1, and/or secp521k1, among other fields with a prime number and/or quantity of elements that are possible and contemplated herein. In the various embodiments, the prime number and/or prime quantity of elements can be any suitable prime number and/or prime quantity of elements.

In other embodiments, the elliptical curve includes a public field parameter with a power of 2 number and/or quantity of elements. That is, in various embodiments, the elliptical curve can include the field secp283k1, secp409k1, and/or secp571k1, among other fields with a power of 2 number and/or quantity of elements that are possible and contemplated herein. In the various embodiments, the power of 2 number and/or power of 2 quantity of elements can be any suitable power of 2 number and/or power of 2 quantity elements.

In still other embodiments, Barreto-Naehrig (BN) pairing-friendly elliptical curves or other BN curves can be utilized. Thus, several different types of curves can be used with a Zero Knowledge Commitment.

Figure 4:
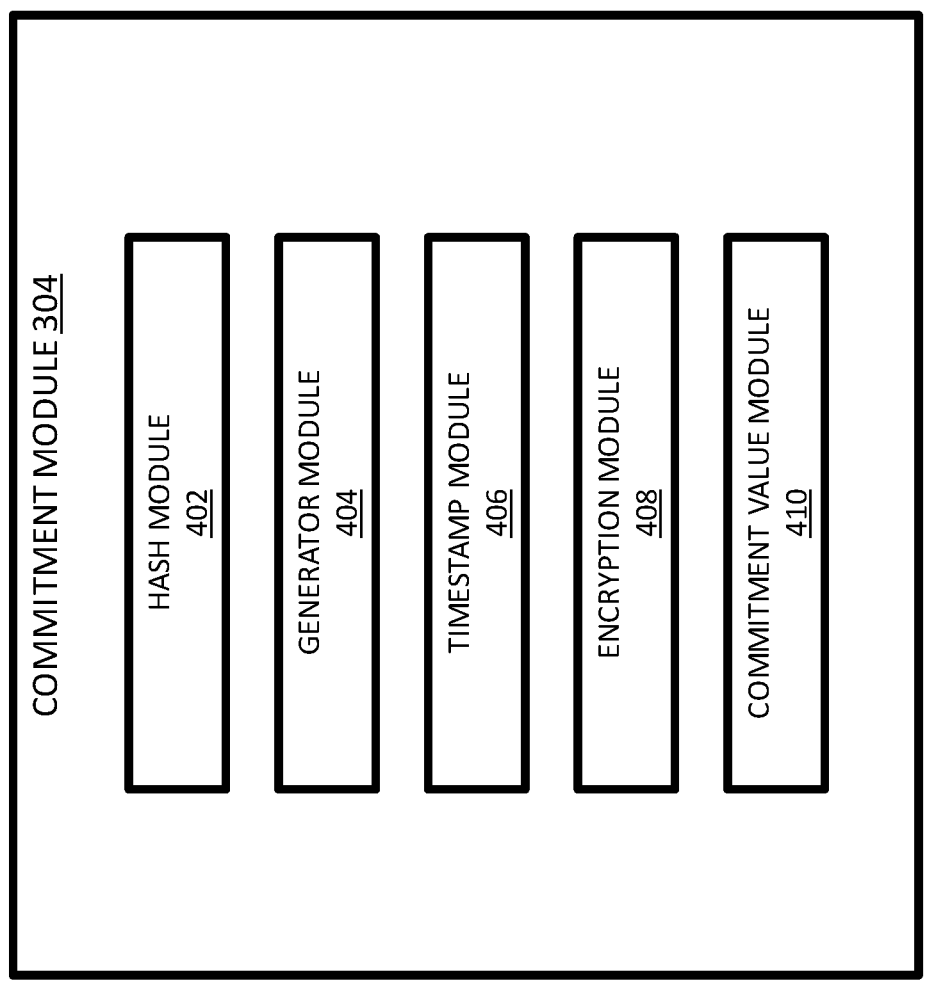
FIG. 4 is a block diagram of one embodiment of a commitment module.

With reference to FIG. 4, FIG. 4 is a block diagram of one embodiment of a commitment module 304. At least in the illustrated embodiment, the commitment module 304 includes, among other components, a hash module 402, a generator module 404, a timestamp module 406, an encryption module 408, and a commitment value module 410.

A hash module 402 may include any suitable hardware and/or software that can perform a hash function and/or calculation on a password. In various embodiments, the hash module 402 is configured to receive a password from the password module 302 and perform a hash function and/or calculation on the password.

The hash module 402 may perform any suitable cryptographic hash function and/or calculation on the password that is known or developed in the future that can generate a hashed value (e.g., a hashed password (S)). In various embodiments, the hash module 402 is configured to perform a Secure Hash Algorithm 2 (SHA-2) on the password in generating the value S. That is, the hash module 402 may be configured to perform a SHA-2 function with 256 bits (SHA-256), 384 bits (SHA-384), or 512 bits (SHA-512, SHA-512/224, or SHA-512/256), among other SHA-2 functions that are possible and contemplated herein. Alternatively, password based key derivation functions, such as PDBKF2, scrypt, bcrypt, and argon2, can be utilized.

The hash module 402, in some embodiments, is configured to store the hashed password or value S. In various embodiments, the hash module 402 is configured to transmit the hashed password or value S to the commitment value module 410 for processing thereon. The hash module 402 is configured not to transmit the hashed password or the value S to the I/O module 306.

A generator module 404 may include any suitable hardware and/or software that can determine and/or identify an elliptical generator (e.g., the value (G)) for the elliptical curve. In various embodiments, the elliptical generator or the value G is determined/identified based on the parameters for the elliptical curve. That is, the elliptical generator or the value G is a value generated from the public field parameter of the elliptical curve. In other words, the value G is generated/determined from the public parameters of the prime number field (e.g., secp256k1, secp384k1, secp521k1, etc.), the power of 2 field (e.g., secp283k1, secp409k1, secp571k1, etc.), or other elliptical curves (e.g., Barreto-Naehrig (BN) pairing-friendly elliptical curves or other BN curve(s), etc.).

The generator module 404, in some embodiments, is configured to store the value G. In various embodiments, the generator module 404 is configured to transmit the value G to the commitment value module 410 for processing thereon and/or to the I/O module 306.

A timestamp module 406 may include any suitable hardware and/or software that can generate a hashed value that is based on time. In various embodiments, the timestamp module 406 is configured to generate a value H for the commitment C(S,R).

In various embodiments, the value H is generated by calculating the value G hashed to a timestamp to a point on the elliptical curve. In certain embodiments, the value H is a large value.

The timestamp module 406 may utilize any hashing method, technique, and/or value that is known or developed in the future to generate H by hashing G to the timestamp to the point on the elliptical curve. In various embodiments, the timestamp module 406 generates H as a derivative of G using a hash function with a time factor as one of the attribute, which can be represented as, to_point(Hashing Function (G, timestamp/time range)).

In some embodiments, the timestamp module 406 generates H as a derivative of G using the hash function, to_point(SHA256 (ENCODE(G))), among other hash functions that are possible and contemplated herein.

In some embodiments, the value H includes a token that is valid for a predetermined amount of time, which can be any suitable amount of time for a particular password, application, and/or computing system/device. In certain embodiments, the token is valid for about 5 minutes, among other amounts of time that are possible and contemplated herein. In other embodiments, the token is valid for an amount of time that is less than about 5 minutes or for an amount of time that is greater than about 5 minutes, among other time values that are possible and contemplated herein.

The timestamp module 406, in some embodiments, is configured to store the value H. In various embodiments, the timestamp module 406 is configured to transmit the value H to the commitment value module 410 for processing thereon. In further embodiments, the timestamp module 406 is configured to transmit the H value (and the timestamp and/or the token) to the I/O module 306.

An encryption module 408 may include any suitable hardware and/or software that can generate an encryption value, an encryption key, and/or a salt value (simply referred to herein as, salt, a salt value, or the value R), which can be referred to as a blinding factor. The length of the salt value (or salt) can be any suitable length that can sufficiently encrypt the password so that the password is not easily detectable and/or discernable. Further, the salt value can be any suitable value that can sufficiently encrypt a password so that the password is not easily detectable and/or discernable.

In some embodiments, the salt value includes a random length and a random salt value. In other embodiments, the salt value includes a static length and a random salt value. In still other embodiments, the salt value includes a static value and a static salt length.

The encryption module 408, in some embodiments, is configured to store the salt or value R. In various embodiments, the encryption module 408 is configured to transmit the salt or value R to the commitment value module 410 for processing thereon and/or to the I/O module 306.

A commitment value module 410 may include any suitable hardware and/or software that can calculate a commitment value. In various embodiments, the commitment value module 410 is configured to receive the value H, the value G, the value H, and the value R and calculate a commitment value C for the commitment C(S,R) (see, e.g., equation (1) above). That is, the commitment value module 410 is configured to calculate a commitment value C by plugging in the values received from the hash module 402, the generator module 404, the timestamp module 406, and the encryption module 408.

In some embodiments, the commitment value module 410 is configured to generate an initial commitment value C0 ((S0*G)+(H0*R0)) in response to the password module 302 and/or the user creating/generating a new or initial password for accessing the host 106, in which S0 is the initial password hashed to a value. In further embodiments, the commitment value module 410 is configured to generate a subsequent commitment value C1 ((S1*G)+(H1*R1)) in response to each attempt by the user to access the host 106, in which S1 is the password used to access the host 106 hashed to a value.

The commitment value module 410, in some embodiments, is configured to store the initial commitment value C0, one or more subsequent commitment values C1, and/or each subsequent commitment value C1. In various embodiments, the commitment value module 410 is configured to transmit the initial commitment value C0 and each subsequent commitment value C1 to the I/O module 306.

Referring again to FIG. 3, an I/O module 306 may include any suitable hardware and/or software that enables and/or allows a client device 104 to communicate and/or share resources with the host 106. In various embodiments, the I/O module 306 is configured to receive the value G from the generator module 404, the timestamp (and token) from the timestamp module 406, the value R from the encryption module 408, and the initial commitment value C0 and each subsequent commitment value C1 from the commitment value module 410 and transmit the value G, the H value (and the timestamp and/or token), the value R, the initial commitment value C0, and each subsequent commitment value C1 to the host 106 for storage and/or processing on the host 106.

Notably, the I/O module 306 does not receive the value S from the hash module 402 and, thus, the value S is not transmitted to the host 106. That is, the host 106 never receives the value S from the client device 104, but instead, uses the initial commitment value C0, the G value, two H values, two R values, and a subsequent commitment value C1 to verify the authenticity of a password each time the client device 104 attempts to access the host 106. In other words, the host 106 does not utilize the password itself to verify the authenticity of a password when the client device 104 is attempting to access the host 106.

With reference again to FIG. 2A, a processor 208 may include any suitable non-volatile/persistent hardware and/or software configured to perform and/or facilitate performing functions and/or operations for facilitating verification of a password on a host 106. In various embodiments, the processor 208 includes hardware and/or software for executing instructions in one or more modules and/or applications that can perform and/or facilitate performing functions and/or operations for facilitating verification of a password on the host 106. The modules and/or applications executed by the processor 208 for facilitating verification of a password on a host 106 can be stored on and executed from a memory device 206 and/or from the processor 208.

Figure 5:
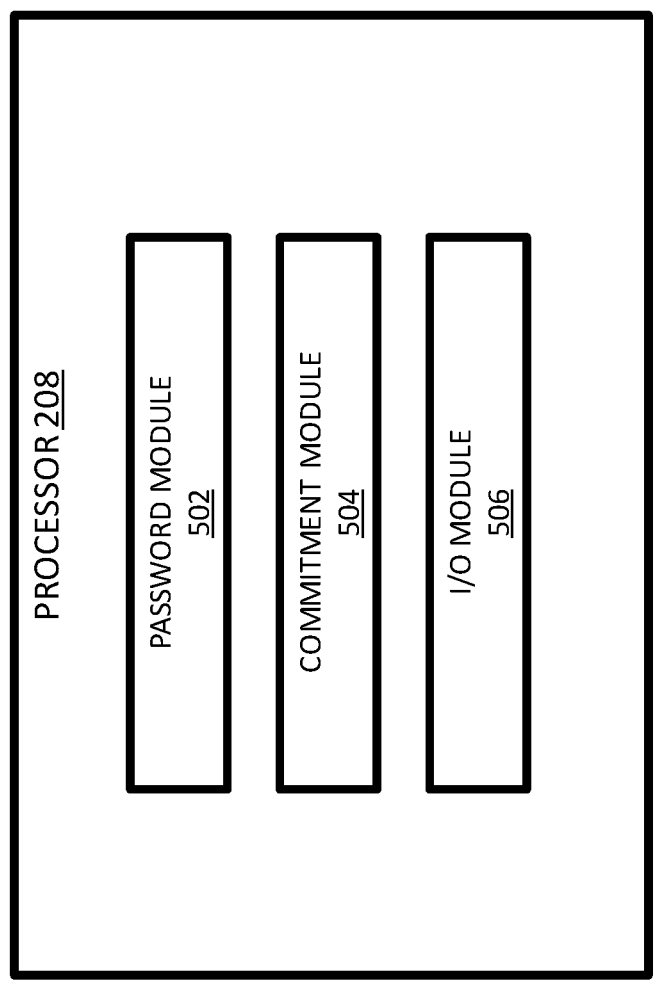
FIG. 5 is a block diagram of one embodiment of a processor included in the client device of FIG. 2A or 2B.

With reference to FIG. 5, FIG. 5 is a schematic block diagram of one embodiment of a processor 208. At least in the illustrated embodiment, the processor 208 includes, among other components, a password module 502, a commitment module 504, and an I/O module 506 similar to the password module 302, the commitment module 304, and the I/O module 306 discussed elsewhere herein with reference to the memory device(s) 206.

In various embodiments, the commitment module 504 includes a hash module 402, a generator module 404, a timestamp module 406, an encryption module 408, and a commitment value module 410 similar to the commitment module 304 discussed herein with reference to the memory device(s) 206. Accordingly, a client device 104 can include the hash module 402, the generator module 404, the timestamp module 406, the encryption module 408, and/or the commitment value module 410 on the set of memory devices 206 and/or on the processor 208.

Figure 2B:
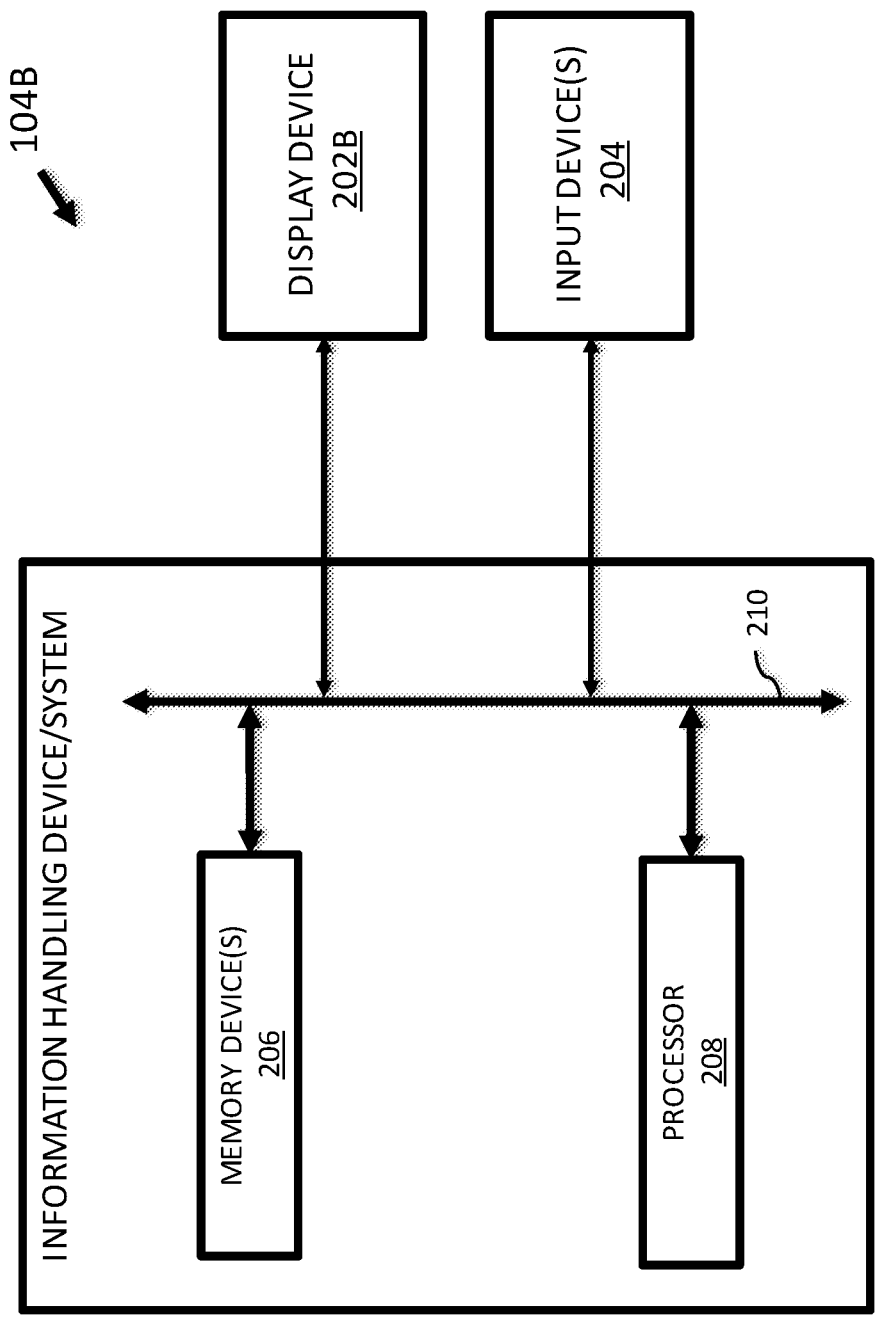
FIG. 2B is a block diagram of another embodiment of a client device included in the system/network of FIG. 1.

Referring to FIG. 2B, FIG. 2B is a block diagram of one embodiment of a client device 104B illustrated in and discussed with reference to FIG. 1. In various embodiments, a client device 104B may form a non-mobile computing device/system (e.g., a desktop computer, a set-top box, a game console, a vehicle on-board computer, and a streaming device, etc., among other information handling devices that utilize an external display device that are possible and contemplated herein). At least in the illustrated embodiment, a client device 104B includes a set of display devices 202B (e.g., one or more external displays and/or monitors). The client device 104B further includes, among other components, a set of input devices 204, a set of memory devices 206, and a processor 208 coupled to and in communication with one another via a bus 210 (e.g., a wired and/or wireless bus) similar to the set of input devices 204, the set of memory devices 206, and the processor 208 coupled to and in communication with one another via the bus 210 in the client device 104A discussed with reference to FIG. 2B.

Figure 6:
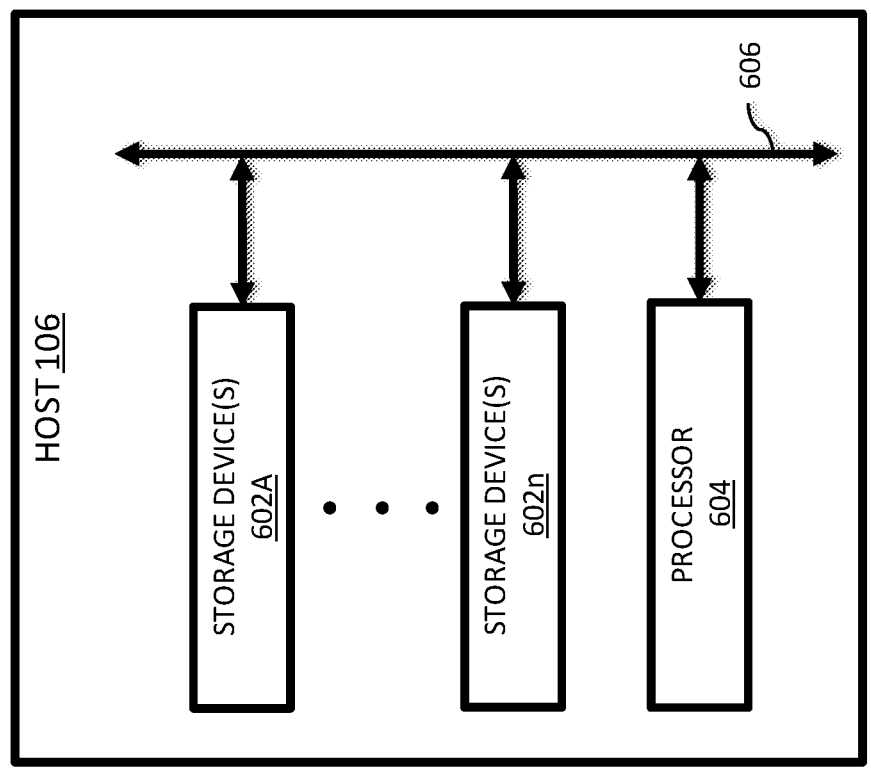
FIG. 6 is a block diagram of one embodiment of a host included in the system/network of FIG. 1.

With reference to FIG. 6, FIG. 6 is a block diagram of one embodiment of a host 106 illustrated in and discussed with reference to FIG. 1. The host 106 (or host device 106) may include any suitable computer hardware and/or software that is known or developed in the future that can provide host operations. In various embodiments, a host 106 can include one or more processors, computer-readable memory, and/or one or more interfaces, among other features and/or hardware. A host 106 can further include any suitable software component or module, or computing device(s) that is/are capable of hosting and/or serving a software application or services, including distributed, enterprise, and/or cloud-based software applications, data, and services. For instance, a host 106 can be configured to host, serve, or otherwise manage data sets, or applications interfacing, coordinating with, or dependent on or used by other services, including transportation service applications and software tools. In some instances, a host 106 can be implemented as some combination of devices that can comprise a common computing system, server, server pool, or cloud computing environment and share computing resources, including shared memory, processors, and interfaces. At least in the illustrated embodiment, the host 106 includes, among other components, a set of storage devices 602A through 602n and a processor 604 coupled to and in communication with one another via a bus 606 (e.g., a wired and/or wireless bus).

The storage devices 602A through 602n (also simply referred individually, in various groups, or collectively as storage device(s) 602) may be any suitable type of device and/or system that is known or developed in the future that can store computer-useable data. In various embodiments, a storage device 602 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

Figure 7:
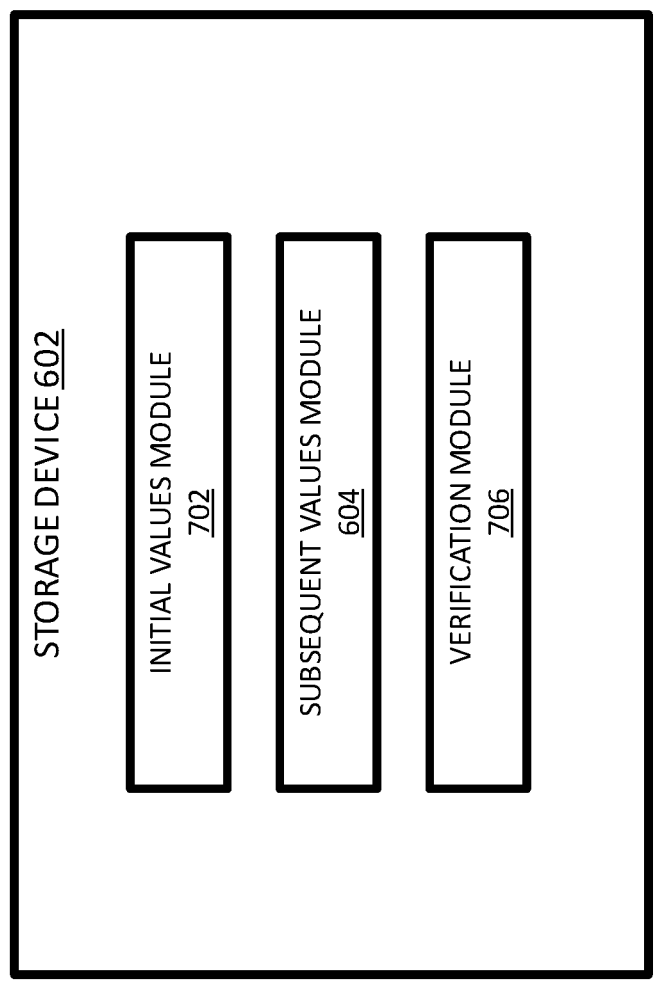
FIG. 7 is a block diagram of one embodiment of a storage device included in the host of FIG. 6.

Referring to FIG. 7, FIG. 7 is a schematic block diagram of an embodiment of a storage device 602. At least in the illustrated embodiment, the storage device 602 includes, among other components, an initial values module 702, a subsequent values module 704, and a verification module 706.

An initial values module 702 may include any suitable hardware and/or software that can receive and store one or more sets of initial values. In various embodiments, the initial values module 702 is configured to receive the value G, an initial H value H0 (and an initial timestamp), an initial R value R0, and an initial commitment value C0 from the client device 104 and store the value G0, the initial timestamp value, the value R0, and the initial commitment value C0.

The value G, the initial timestamp value, the initial R value R0, and the initial commitment value C0 are the values generated by the client device 104 when the client device 104 and/or the user creates a password for accessing the host device 106. In some embodiments, the initial values module 702 is configured to calculate the initial H value H0 based on the value G and the timestamp value received from the client device 104.

Further, the value G, the initial H value H0, the initial R value R0, and the initial commitment value C0 can be subsequently utilized by the host 106 to verify the authenticity of the password when the client device 104 and/or user attempts to access the host 106. As such, the value G, the initial H value H0, the initial R value R0, and the initial commitment value C0 can be transmitted to the verification module 306 in the future in response to the client device 104 and/or user attempting to access the host 106.

A subsequent values module 704 may include any suitable hardware and/or software that can receive and/or store one or more sets of subsequent values. In various embodiments, the subsequent values module 704 is configured to receive the value G, a subsequent H value H1 (and a subsequent timestamp value and/or a token), a subsequent R value R1, and a subsequent commitment value C1 from the client device 104. In some embodiments, the subsequent values module 704 is configured to store the value G, the subsequent H value H1, the subsequent R value R1, and the subsequent commitment value C1.

The value G, the subsequent H value H1, the subsequent R value R1, and the subsequent commitment value C1 are the values generated by the client device 104 when the client device 104 and/or the user inputs a password in an attempt to access the host device 106. Further, the value G, the subsequent H value H1, the subsequent R value R1, and the subsequent commitment value C1 are utilized by the host 106 to verify the authenticity of the password input by the client device 104 and/or user. As such, the value G, the subsequent H value H1, the subsequent R value R1, and the subsequent commitment value C1 can be transmitted to the verification module 306 in response to the client device 104 and/or user attempting to access the host 106.

A verification module 706 may include any suitable hardware and/or software that can verify the authenticity of a password in a commitment schema. In various embodiments, the verification module 706 is configured to verify the password utilizing the initial values stored in the initial values module 702 and the subsequent values in the subsequent values module 704.

The verification module 706, in some embodiments, is configured to receive the value G, the initial H value H0, the initial R value R0, and the initial commitment value C0 from the initial values module 702 and the value G, the subsequent H value H1, the subsequent R value R1, and the subsequent commitment value C1 from the subsequent values module 704 in response to the client device 104 and/or the user attempting to access the host 106. In various embodiments, the verification module 706 is configured to verify the password based on a mathematical difference between the initial values and the subsequent values. In other words, the verification module 706 is configured to verify the password utilizing a verification process and/or algorithm.

One portion of a verification process and/or algorithm performed by the verification module 706 includes determining a mathematical difference (e.g., a value) between the subsequent commitment value C1 and the initial commitment value C0 (e.g., C1−C0, C0−C1, |C1−C0|, or |C0−C1|). Another portion of the verification process and/or algorithm performed by the verification module 706 includes determining the mathematical value of the product of the subsequent H value H1 and the subsequent R value R1 (H1*R1) and the mathematical value of the product of the initial H value H0 and the initial R value R0 (H0*R0). A further portion of the verification process and/or algorithm performed by the verification module 706 includes determining the mathematical difference (e.g., a value) between the product of the subsequent H value H1 and the subsequent R value R1 and the product of the initial H value H0 and the initial R value R0 (e.g., (H1*R1)−(H0*R0), (H0*R0)−(H1*R1), |(H1*R1)−(H0*R0)|, and |(H0*R0)−(H1*R1)|). A certain portion of the verification process and/or algorithm performed by the verification module 706 includes comparing the mathematical difference between the subsequent commitment value C1 and the initial commitment value C0 and the mathematical difference between the product of the subsequent H value H1 and the subsequent R value R1 and the product of the initial H value H0 and the initial R value R0.

The verification module 706 is configured to verify that the password is authentic in response to the two differences matching one another (e.g., C1−C0=[(H1*R1)−(H0−R0)]). Further, the verification module 706 is configured to deem the password not authentic in response to the two differences not matching one another (e.g., C1−C0 [(H1*R1)−(H0−R0)]). Here, the Pedersen commitment ensures that the password is valid or authentic while not sharing the password with a host 106 (and/or server). The following is the logic supporting the verification process:

$$C1=[(S*G)+(H1*R1)], \text{ and}$$

$$C0=[(S*G)+(H0*R0)].$$

Therefore, by substitution, $$C1-C0=[(S*G)+(H1*R1)]-[(S*G)+(H0*R0)],$$

$$C1-C0=(S*G)+(H1*R1)-(S*G)-(H0*R0),$$

$$C1-C0=(S*G)-(S*G)+(H1*R1)-(H0*R0),$$

$$C1-C0=[(H1*R1)-(H0*R0)].$$

Thus, if C1−C0=[(H1*R1)−(H0*R0)], the (S*G) values must be the same value, which means the hashed passwords must be the same value, which further means that the passwords match and can, thus, be verified by the verification module 706.

In some embodiments, the verification module 706 is configured to grant access to the host 106 to the client device 104 and/or user in response to the password be verified (e.g., C1−C0=[(H1*R1)−(H0*R0)]). Further, the verification module 706 is configured to deny access to the host 106 to the client device 104 and/or user in response to the password be not verified (e.g., C1−C0 [(H1*R1)−(H0*R0)]).

In certain embodiments, the password is valid for a predetermined period of time. The predetermined period of time, in various embodiments, is based on the token included in the timestamp received from the client device 104. That is, the predetermined period of time may be, for example, 5 minutes, among other amounts of time that are greater than 5 minutes or less than 5 minutes that are possible and contemplated herein.

In some embodiments, at the expiration of the amount of time included in the token and/or timestamp, the client device 104 (and/or user) is logged out of the host 104. Here, the client device 104 and/or the user can re-enter the password into the client device 104 and the password verification process between the client device 104 and the host 106 for accessing the host device 106 can be repeated.

In this manner, a password for accessing the host 106 without the host 106 ever storing the actual password can be obtained. Here, the client device 104 can store the password, which can render the host 106 more secure because disclosure/leakage of a commitment by the host 106 will not comprise the password and/or the hashed password.

Figure 8:
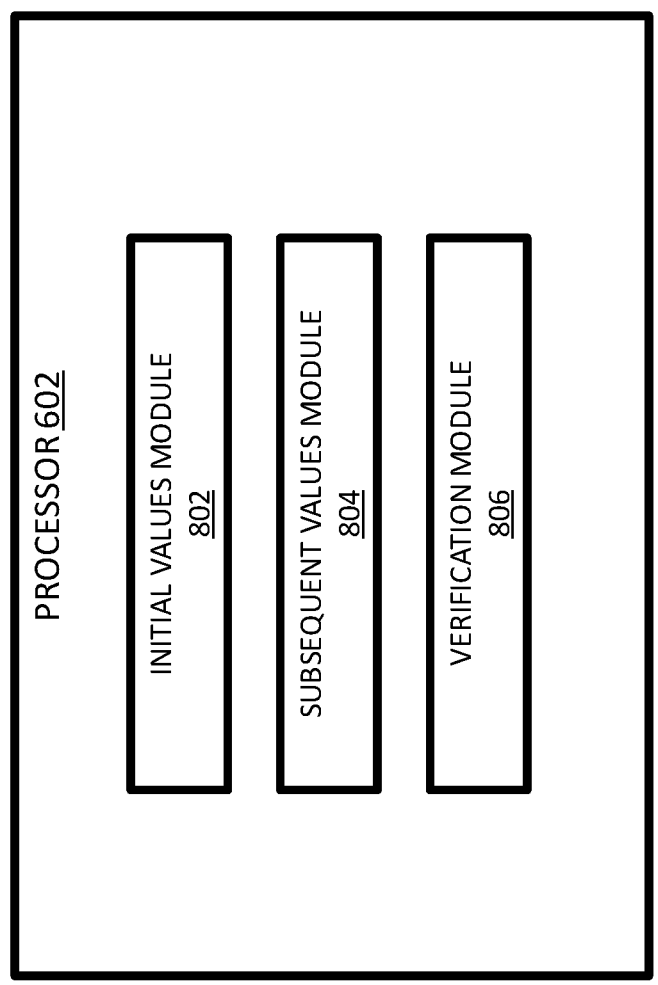
FIG. 8 is a block diagram of one embodiment of a processor included in the host of FIG. 6.

With reference to FIG. 8, FIG. 8 is a schematic block diagram of an embodiment of a processor 604. At least in the illustrated embodiment, the processor 604 includes, among other components, an initial values module 802, a subsequent values module 804, and a verification module 806 similar to the initial values module 702, the subsequent values module 704, and the verification module 706 included in the storage device(s) 604 discussed with reference to FIG. 7. Accordingly, a host 106 can include the initial values module 702, the subsequent values module 704, and the verification module 706 on the set of storage devices 602 and/or the initial values module 802, the subsequent values module 804, and the verification module 806 on the processor 604.

Figure 9:
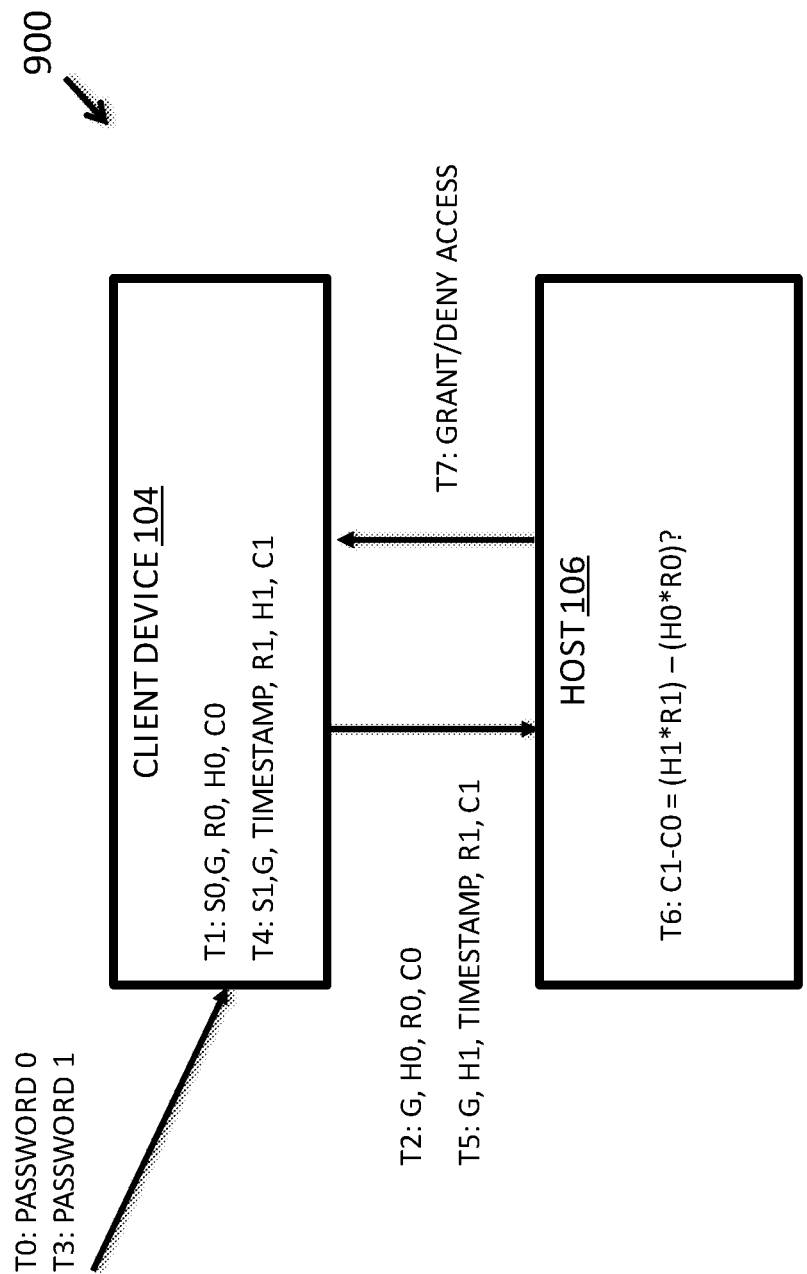
FIG. 9 is a timing diagram of the operations of one embodiment of the system/network of FIG. 1.

With reference to FIG. 9, FIG. 9 is a timing diagram 900 of one embodiment of operations for verifying a password using commitments. At least in the illustrated embodiment, the operations begin at time T0 by receiving, at a client device 104, an initial password0 for accessing a host 106.

At time T1, a processor (e.g., processor 208) can calculate and store a hashed password S0 for the password0, a value G, an initial H value H0, an initial R value R0, and an initial commitment value C0, as discussed elsewhere herein. The processor 208, at time T2, transmits the value G, initial H value H0, initial R value R0, and initial commitment value C0 to the host 106 for storage thereon. The processor 208 does not transmit the hashed password S1 to the host 106.

In some embodiments, the client device 104, at time T3, receives a subsequent password1 from a user when the user is attempting to access the host 106 via the client device. At time T4, the processor 208 calculates a hashed password S1 for the password1, a value G, a subsequent H value H1, a subsequent R value R1, and a subsequent commitment value C1, as discussed elsewhere herein.

The processor 208, at time T5, transmits the value G, subsequent H value H1, subsequent R value R1, and subsequent commitment value C1 to the host 106 for verifying the password1. The processor 208 does not transmit the hashed password S2 to the host 106.

The host 106, at time T6, calculates whether C1−C0= [(H1\*R1)−(H0\*R0)] or C1−C0 [(H1\*R1)−(H0\*R0)]). At time T7, in response to C1−C0=[(H1\*R1)−(H0\*R0)], the host 106 allows the client device 104 to access the host 106 or, in response to C1−C0 [(H1\*R1)−(H0\*R0)]), the host 106 denies the client device 104 from accessing the host 106.

Figure 10:
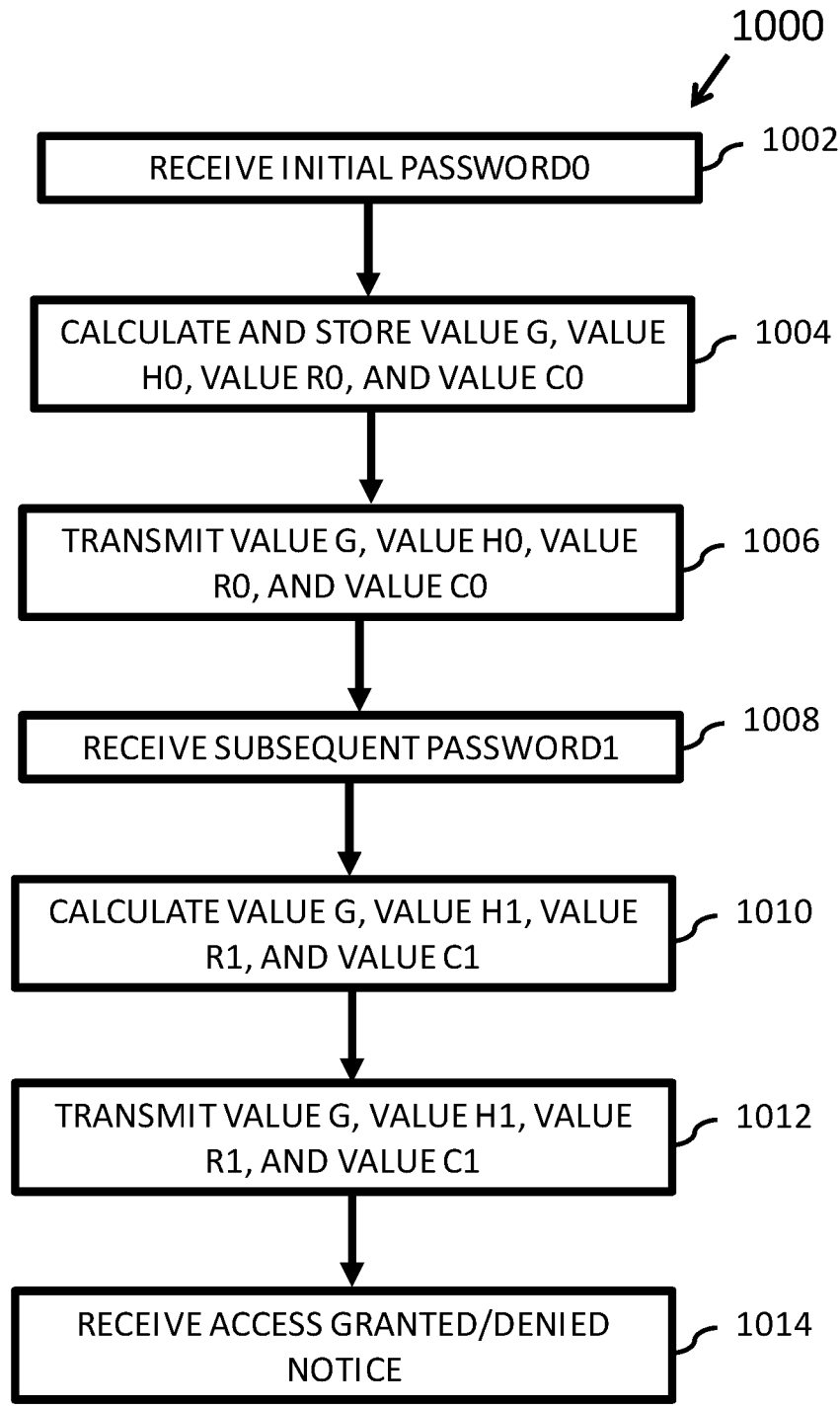
FIG. 10 is a schematic flow chart diagram illustrating one embodiment of a method for verifying a password utilizing commitments.

Referring to FIG. 10, FIG. 10 is a schematic flow chart diagram illustrating one embodiment of a method 1000 for verifying a password utilizing commitments. At least in the illustrated embodiment, the method 1000 can begin by a processor (e.g., processor 208) receiving, at a client device 104, an initial password0 for accessing a host 106 (block 1002).

The processor 208 can calculate and store a hashed password S0 for the password0, a value G, an initial H value H0, an initial R value R0, and an initial commitment value C0, as discussed elsewhere herein (block 1004). The processor 208 transmits the value G, initial H value H0, initial R value R0, and initial commitment value C0 to the host 106 for storage thereon (block 1006). The processor 208 does not transmit the hashed password S1 to the host 106.

In some embodiments, the processor 208 receives a subsequent password1 from a user when the user is attempting to access the host 106 via the client device (block 1008).

The processor 208 calculates a hashed password S1 for the password1, a value G, a subsequent H value H1, a subsequent R value R1, and a subsequent commitment value C1, as discussed elsewhere herein (block 1010).

The processor 208 transmits the value G, subsequent H value H1, subsequent R value R1, and subsequent commitment value C1 to the host 106 for verifying the password1 (block 1012). The processor 208 does not transmit the password1 or the hashed password S1 to the host 106.

The processor 208 receives notice that access to the host has been granted or denied (block 1014). The method 1000 can then end.

Figure 11:
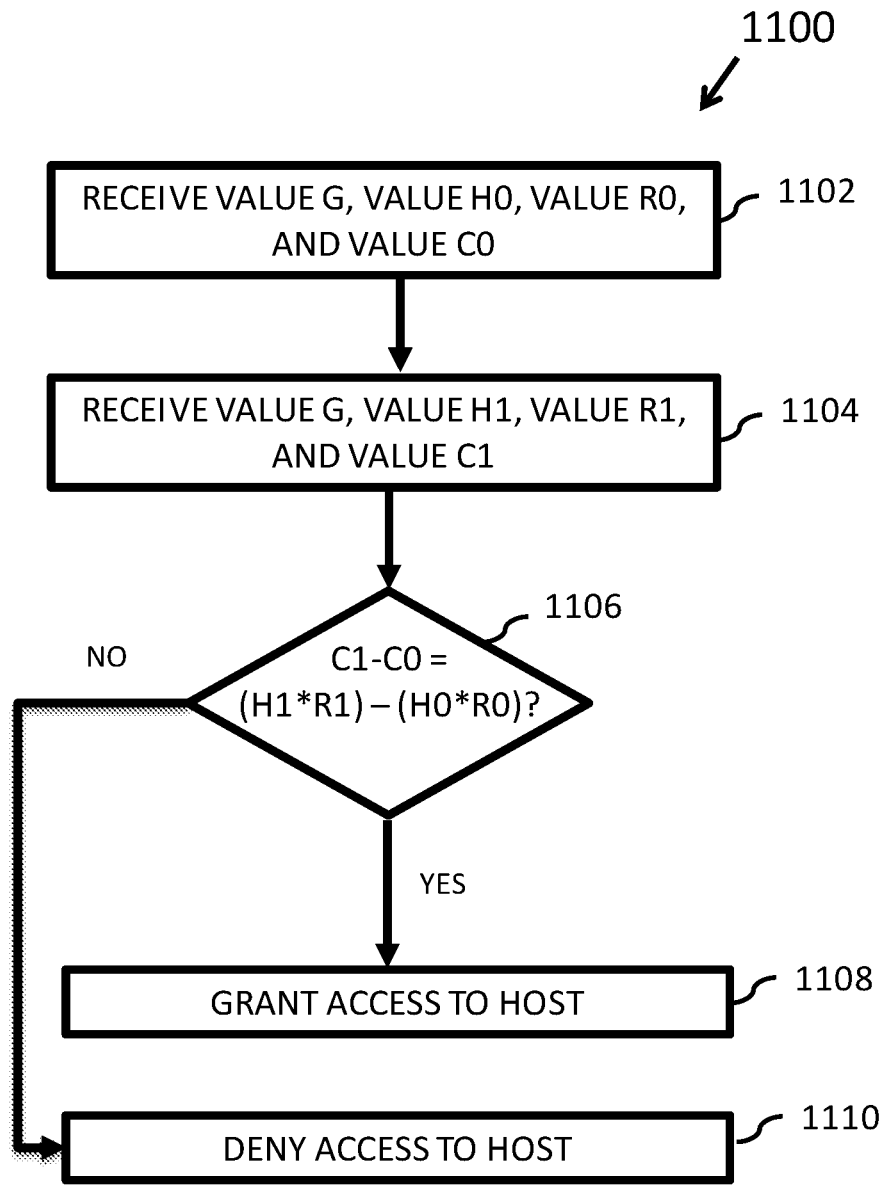
FIG. 11 is a schematic flow chart diagram illustrating another embodiment of a method for verifying a password utilizing commitments.

With reference to FIG. 11, FIG. 11 is a schematic flow chart diagram illustrating another embodiment of a method 1100 for verifying a password utilizing commitments. At least in the illustrated embodiment, the method 1100 can begin by a processor (e.g., processor 604) receiving, at a client device 104, a value G, an initial H value H0, an initial R value R0, and an initial commitment value C0 for an initial password0 for storage thereon, as discussed elsewhere herein (block 1102). The processor 604 does not receive a password0 or a hashed password S0.

The processor 604 subsequently receives a value G, a subsequent H value H1, a subsequent R value R1, and a subsequent commitment value C1 for a subsequent passowrd1 when the client device 104 is attempting to access the host 106, as discussed elsewhere herein (block 1104). The processor 604 does not receive the password1 or the hashed password S1.

The processor 604 calculates whether C1−C0=[(H1\*R1)− (H0\*R0)] (block 1106). In response to C1−C0=[(H1\*R1)− (H0\*R0)] (a "YES" in block 1106), the processor 604 grants access to the client device 104 (block 1108). In response to C1−C0 [(H1\*R1)−(H0\*R0)]) (e.g., a "NO" in block 1106), the processor 604 denies the client device 104 access to the host 106 (block 1110).

Figure 12:
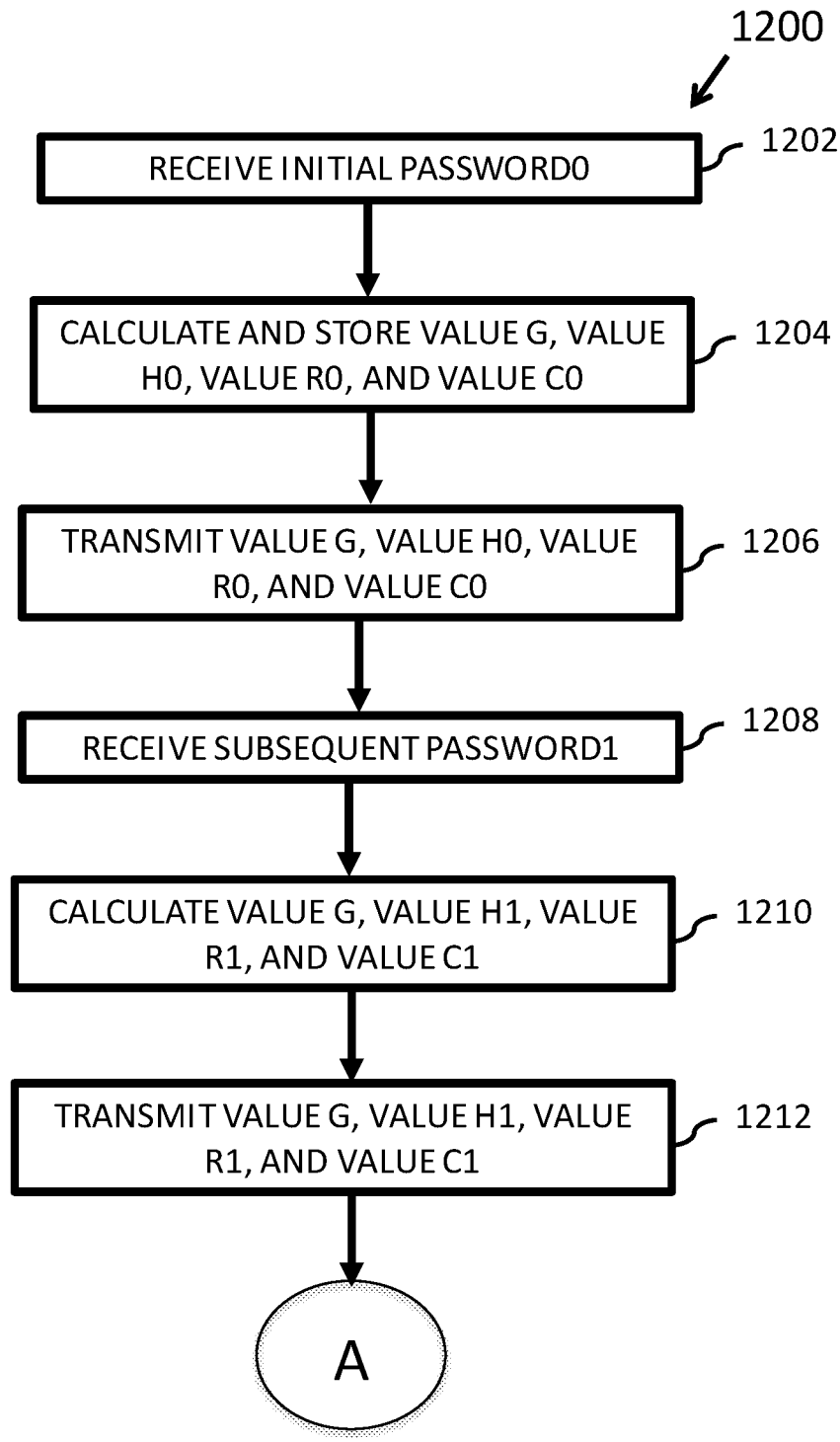
FIG. 12 is a schematic flow chart diagram illustrating yet another embodiment of a method for verifying a password utilizing commitments.
Figure 12:
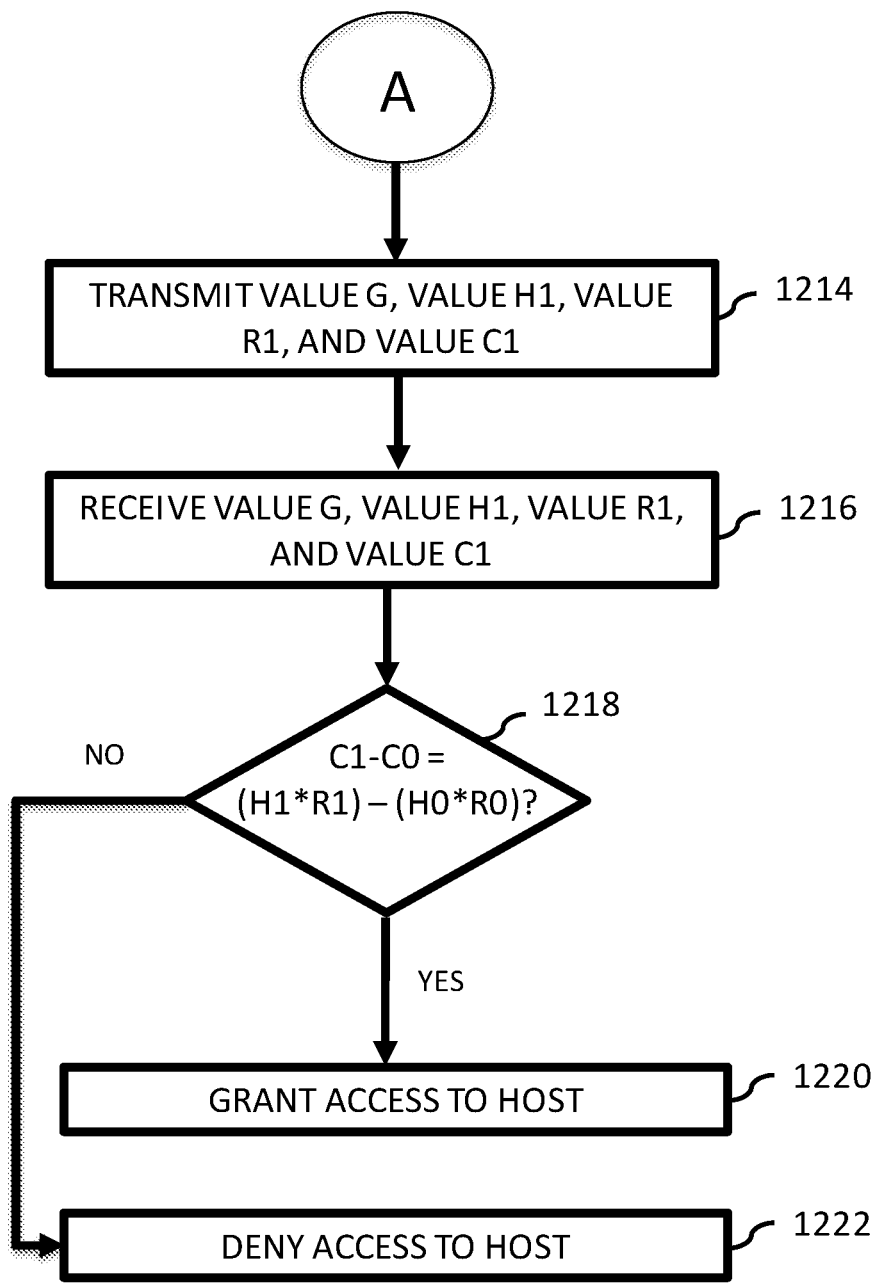

Referring to FIG. 12, FIG. 12 is a schematic flow chart diagram illustrating yet another embodiment of a method 1200 for verifying a password utilizing commitments. At least in the illustrated embodiment, the method 1200 can begin by a processor (e.g., processor 208) receiving, at a client device 104, an initial password0 for accessing a host 106 (block 1202).

The processor 208 can calculate and store a hashed password S0 for the password0, a value G, an initial H value H0, an initial R value R0, and an initial commitment value C0, as discussed elsewhere herein (block 1204). The processor 208 transmits the value G, initial H value H0, initial R value R0, and initial commitment value C0 to the host 106 for storage thereon (block 1206). The processor 208 does not transmit the hashed password S1 to the host 106.

A processor (e.g., processor 604) receives, at a client device 104, the value G, initial H value H0, initial R value R0, and initial commitment value C0 for storage thereon (block 1208). The processor 604 does not receive the password0 or the hashed password S0.

The processor 208 receives a subsequent password1 from a user when the user is attempting to access the host 106 via the client device (block 1210). The processor 208 calculates a hashed password S1 for the password1, a value G, a subsequent H value H1, a subsequent R value R1, and a subsequent commitment value C1, as discussed elsewhere herein (block 1212).

The processor 208 transmits the value G, subsequent H value H1, subsequent R value R1, and subsequent commitment value C1 to the host 106 for verifying the password1

(block 1214). The processor 208 does not transmit the password1 or the hashed password S1 to the host 106.

The processor 604 receives the value G, subsequent H value H1, subsequent R value R1, and subsequent commitment value C1 for a subsequent passowrd1 when the client device 104 is attempting to access the host 106, as discussed elsewhere herein (block 1216). The processor 604 does not receive the password1 or the hashed password S1.

The processor 604 calculates whether $C1-C0=[(H1*R1)-(H0*R0)]$ (block 1218). In response to $C1-C0=[(H1*R1)-(H0*R0)]$ (a "YES" in block 1218), the processor 604 grants access to the client device 104 (block 1220). In response to $C1-C0 [(H1*R1)-(H0*R0)])$ (e.g., a "NO" in block 1218), the processor 604 denies the client device 104 access to the host 106 (block 1222).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory configured to store code executable by the processor to:
receive, from a client device, and store an initial commitment representing a password for a user account without storing the actual password on the apparatus,
receive, from the client device, a subsequent commitment, and
verify that the subsequent commitment represents the password for the user account based on a difference between the initial commitment and the subsequent commitment,
wherein the initial commitment and the subsequent commitment are each time-based commitments.

2. The apparatus of claim 1, wherein the initial commitment and the subsequent commitment are each Pedersen time-based commitments.

3. The apparatus of claim 1, wherein:
the initial commitment is represented by a first commitment equation $C0=(S0*G+R0*H0)$, and
the subsequent commitment is represented by a second commitment equation $C1=(S1*G+R1*H1)$,
where,
S0 is a first hashed value of the password,
G is an elliptical generator value for an elliptical curve,
R0 is a first salt value,
H0 is the G elliptical generator value hashed to an initial timestamp value to a point on the elliptical curve,
S1 is a second hashed value of the password,
R1 is a second salt value,
H1 is the G elliptical generator value hashed to a subsequent timestamp value to the point on the elliptical curve.

4. The apparatus of claim 3, wherein the password is verified in response to $C1-C0=(R1*H1-R0*H0)$.

5. The apparatus of claim 4, wherein:
R0 is a first random salt value;
R1 is a second random salt value; and
S0 and S1 are a same hashed value for the password.

6. The apparatus of claim 3, wherein:
R0 is a first random salt value;
R1 is a second random salt value; and
S0 and S1 are a same hashed value for the password.

7. A method, comprising:
receiving from a client device and storing, by a processor, an initial commitment representing a password for a user account without storing the actual password on the apparatus;
receiving, from the client device, a subsequent commitment; and
verifying that the subsequent commitment represents the password for the user account based on a difference between the initial commitment and the subsequent commitment,
wherein the initial commitment and the subsequent commitment are each time-based commitments.

8. The method of claim 7, wherein the initial commitment and the subsequent commitment are each Pedersen time-based commitments.

9. The method of claim 7, wherein:
the initial commitment is represented by a first commitment equation $C0=(S0*G+R0*H0)$, and
the subsequent commitment is represented by a second commitment equation $C1=(S1*G+R1*H1)$,
where,
S0 is a first hashed value of the password,
G is an elliptical generator value for an elliptical curve,
R0 is a first salt value,
H0 is the G elliptical generator value hashed to an initial timestamp value to a point on the elliptical curve,
S1 is a second hashed value of the password,
R1 is a second salt value,
H1 is the G elliptical generator value hashed to a subsequent timestamp value to the point on the elliptical curve.

10. The method of claim 9, wherein the password is verified in response to $C1-C0=(R1*H1-R0*H0)$.

11. The method of claim 10, wherein:
R0 is a first random salt value;
R1 is a second random salt value; and
S0 and S1 are a same hashed value for the password.

12. The method of claim 9, wherein:
R0 is a first random salt value;
R1 is a second random salt value; and
S0 and S1 are a same hashed value for the password.

13. A computer program product comprising a non-transitory computer-readable storage medium configured to store code executable by a processor, the executable code comprising code to perform:
receiving from a client device and storing an initial commitment representing a password for a user account without storing the actual password on the apparatus;
receiving, from the client device, a subsequent commitment; and
verifying that the subsequent commitment represents the password for the user account based on a difference between the initial commitment and the subsequent commitment,
wherein the initial commitment and the subsequent commitment are each time-based commitments.

14. The computer program product of claim 13, wherein the initial commitment and the subsequent commitment are each Pedersen time-based commitments.

15. The computer program product of claim 13, wherein:
the initial commitment is represented by a first commitment equation $C0=(S0*G+R0*H0)$, and the subsequent commitment is represented by a second commitment equation $C1=(S1*G+R1*H1)$,
where,
SO is a first hashed value of the password,
G is an elliptical generator value for an elliptical curve,
R0 is a first salt value,
H0 is the G elliptical generator value hashed to an initial timestamp value to a point on the elliptical curve,
S1 is a second hashed value of the password,
R1 is a second salt value,
H1 is the G elliptical generator value hashed to a subsequent timestamp value to the point on the elliptical curve.

16. The computer program product of claim 15, wherein the password is verified in response to $C1-C0=(R1*H1-R0*H0)$.

17. The computer program product of claim 16, wherein:
R0 is a first random salt value;
R1 is a second random salt value; and
S0 and S1 are a same hashed value for the password.

18. The apparatus of claim 1, wherein the processor is configured to utilize a time-based commitment schema to verify that the subsequent commitment represents the password for the user account based on the difference between the initial commitment and the subsequent commitment.

19. The method of claim 7, wherein verifying that the subsequent commitment represents the password for the user account based on a difference between the initial commitment and the subsequent commitment comprises utilizing a time-based commitment schema to verify that the subsequent commitment represents the password for the user account based on the difference between the initial commitment and the subsequent commitment.

20. The computer program product of claim 13, wherein the executable code to perform verifying that the subsequent commitment represents the password for the user account based on a difference between the initial commitment and the subsequent commitment comprises executable code to perform utilizing a time-based commitment schema to verify that the subsequent commitment represents the password for the user account based on the difference between the initial commitment and the subsequent commitment.

* * * * *